(12) United States Patent
Jeon

(10) Patent No.: US 11,212,377 B2
(45) Date of Patent: Dec. 28, 2021

(54) ELECTRONIC DEVICE COMPRISING CAMERA DEVICE AND METHOD

(71) Applicant: Samsung Electronics Co., Ltd., Gyeonggi-do (KR)

(72) Inventor: Hanbyul Jeon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 16/639,609

(22) PCT Filed: Jul. 27, 2018

(86) PCT No.: PCT/KR2018/008527
§ 371 (c)(1),
(2) Date: Feb. 17, 2020

(87) PCT Pub. No.: WO2019/039752
PCT Pub. Date: Feb. 28, 2019

(65) Prior Publication Data
US 2021/0136187 A1  May 6, 2021

(30) Foreign Application Priority Data
Aug. 21, 2017 (KR) .......... 10-2017-0105490

(51) Int. Cl.
*H04M 1/02* (2006.01)
*G03B 15/05* (2021.01)
*H04N 5/225* (2006.01)

(52) U.S. Cl.
CPC .......... *H04M 1/0264* (2013.01); *G03B 15/05* (2013.01); *H04N 5/2252* (2013.01); *H04N 5/2254* (2013.01); *H04N 5/2256* (2013.01)

(58) Field of Classification Search
CPC .............. H04N 5/2251; H04N 5/2252; H04N 5/22521; H04N 5/2254; H04N 5/2256; H04N 5/2257; H04M 1/0264; G03B 15/05
See application file for complete search history.

(56) References Cited

U.S. PATENT DOCUMENTS

2012/0188744 A1    7/2012 Kim
2013/0314582 A1*  11/2013 Masser ............... H04N 5/2256
                                                                 348/340
(Continued)

FOREIGN PATENT DOCUMENTS

JP    2014-174551 A    9/2014
JP    2015-99262 A     5/2015
(Continued)

OTHER PUBLICATIONS

Korean Search Report dated Oct. 22, 2021.

*Primary Examiner* — Daniel M Pasiewicz
(74) *Attorney, Agent, or Firm* — Cha & Reiter, LLC

(57) ABSTRACT

Various embodiments of the present invention relate to an electronic device for blocking light. The electronic device may comprise: a housing comprising a front plate, a rear plate facing in the opposite direction to the front plate, and a side member surrounding the space between the front plate and the rear plate; a touch screen arranged in the space and exposed through the front plate; and a camera assembly exposed through one selected from the front plate and the rear plate. The camera assembly may comprise: a camera lens facing a first part of the one selected from the front plate and the rear plate; a flash facing a second part of the one selected from the front plate and the rear plate; and an opaque layer arranged between the camera lens and the flash when seen from above the one selected from the front plate and the rear plate. The second part may be arranged adjacent (Continued)

to the first part. The camera lens and the flash may be arranged side by side with each other in a first direction. The opaque layer may comprise a first slit extending between the camera lens and the flash on the basis of a second direction that is substantially perpendicular to the first direction. Other embodiments are also possible.

14 Claims, 14 Drawing Sheets

(56) References Cited

U.S. PATENT DOCUMENTS

| | | |
|---|---|---|
| 2014/0253799 A1 | 9/2014 | Moon et al. |
| 2015/0138424 A1 | 5/2015 | Dobashi |

FOREIGN PATENT DOCUMENTS

| | | |
|---|---|---|
| JP | 2016-48343 A | 4/2016 |
| KR | 10-1019477 B1 | 3/2011 |
| KR | 10-2012-0085557 A | 8/2012 |
| KR | 10-1389047 B1 | 4/2014 |
| KR | 10-2014-0133002 A | 11/2014 |

* cited by examiner

ELECTRONIC DEVICE COMPRISING CAMERA DEVICE AND METHOD

CROSS REFERENCE TO RELATED APPLICATIONS

This application is a National Phase Entry of PCT International Application No. PCT/KR2018/008527, which was filed on Jul. 27, 2018, and claims a priority to Korean Patent Application No. 10-2017-0105490, which was filed on Aug. 21, 2017, the contents of which are incorporated herein by reference.

TECHNICAL FIELD

Various embodiments of the disclosure relate to an electronic device and a method including a camera device.

BACKGROUND ART

When capturing an image using an electronic device including a camera device, light generated in a light emitting unit positioned at a periphery of the camera device (e.g., camera) may deteriorate a quality of the image. The electronic device may be produced to sufficiently secure a distance between the light emitting unit and the camera or a separate member may be disposed between the light emitting unit and the camera so that light generated in the light emitting unit positioned at a periphery of the camera device does not affect an image quality. For example, when taking a picture with the electronic device, a separation distance between the camera device and the flash may be sufficiently maintained or a separate member may be disposed to block inflow of light between the camera device and the flash so that light generated in a flash disposed at a periphery of the camera device does not enter into the camera device.

By blocking inflow of light generated at a periphery of the camera device, the electronic device can capture a sharper image similar to a real image.

DISCLOSURE OF INVENTION

Technical Problem

The electronic device may be produced in a size that may be easily carried by a user, and a size of the electronic device may be previously determined. With the development of technology, the electronic device may include more components. In order to efficiently dispose a plurality of components in the electronic device, the plurality of components may be integrated into one module and produced. An electronic device including a camera device may capture an image using the camera device, and a flash may be provided to photograph in a dark environment. The camera device and the flash may be disposed adjacent to each other. As the camera and the flash are disposed adjacent to each other, light generated in the flash may enter into the camera, and a quality of the captured image may be deteriorated because of the entered light.

An electronic device according to various embodiments of the disclosure may provide an electronic device structure that enables light generated in a flash not to enter into a camera lens.

Solution to Problem

According to various embodiments of the disclosure, an electronic device includes a housing including a front plate, a rear plate facing in a direction opposite to that of the front plate, and a side member enclosing a space between the front plate and the rear plate; a touch screen disposed in the space and exposed through the front plate; and a camera assembly exposed through the front plate or the rear plate. The camera assembly includes a camera lens facing a first portion of the front plate or the rear plate; a flash facing a second portion of the front plate or the rear plate; and an opaque layer disposed between the camera lens and the flash when viewed from above the front plate or the rear plate, wherein the second portion is adjacent to the first portion, the camera lens and the flash are disposed side by side in a first direction, and the opaque layer includes a first slit extended between the camera lens and the flash based on a second direction substantially perpendicular to the first direction.

Advantageous Effects of Invention

Various embodiments of the disclosure may implement a slit between a camera lens and a camera flash so that light generated in the camera flash does not enter into the camera lens; thus, the camera lens and the flash can be disposed in a proximity area.

According to various embodiments of the disclosure, a slit area can be implemented between the camera and the flash, and light generated in the flash can be prevented from entering into the camera based on the slit area. According to various embodiments of the disclosure, an image can be captured using a camera without deterioration in an image quality according to inflow of light.

MODE FOR THE INVENTION

Figure 1:
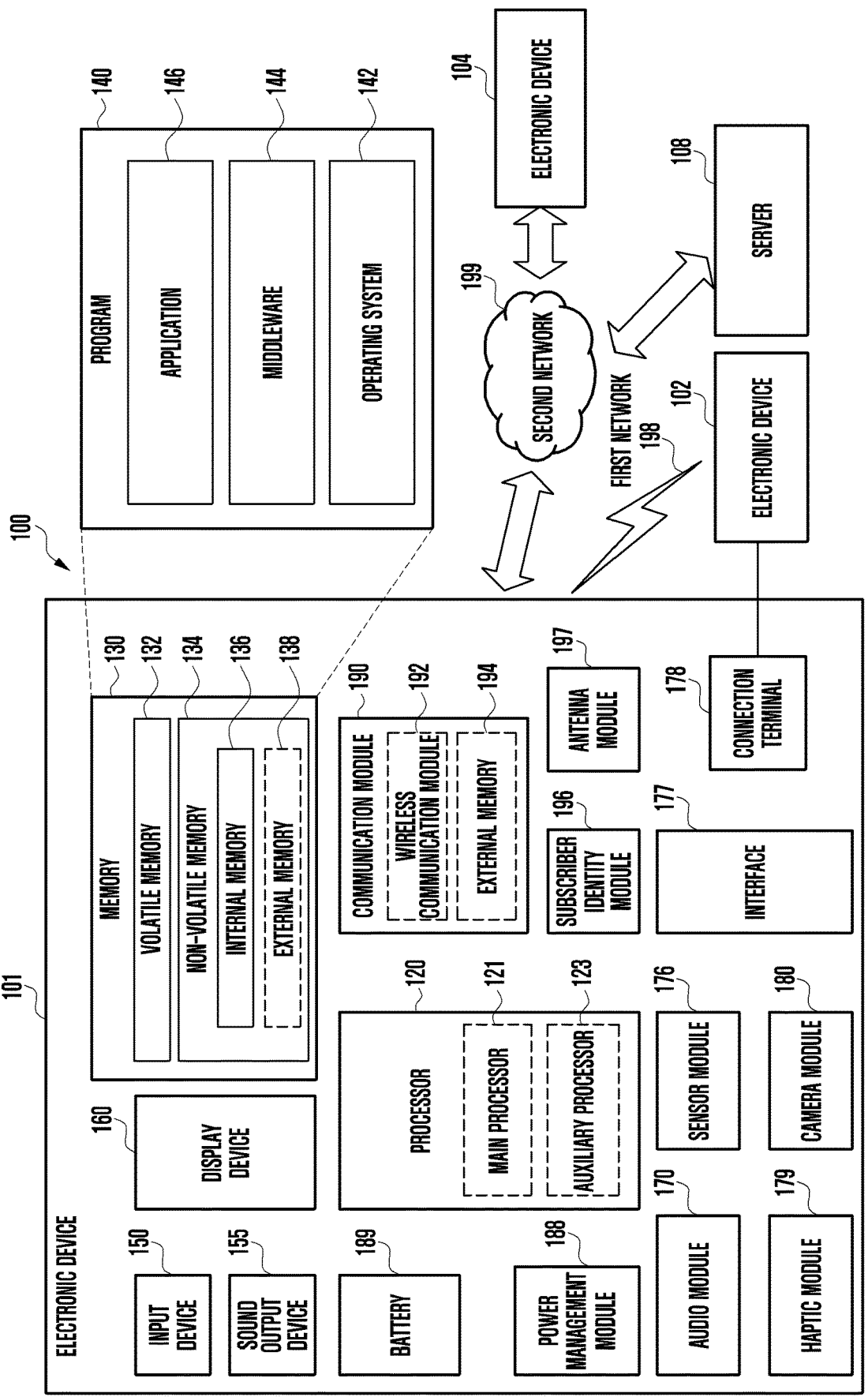
FIG. 1 is a block diagram illustrating a configuration of an electronic device 101 in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 (e.g., DRAM, SRAM or SDRAM) may include the volatile memory 132 or the non-volatile memory 134.

The program 140 may be stored in the memory 130 as software, and may include, for example, an operating system (OS) 142, middleware 144, or an application 146 (e.g., application program).

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
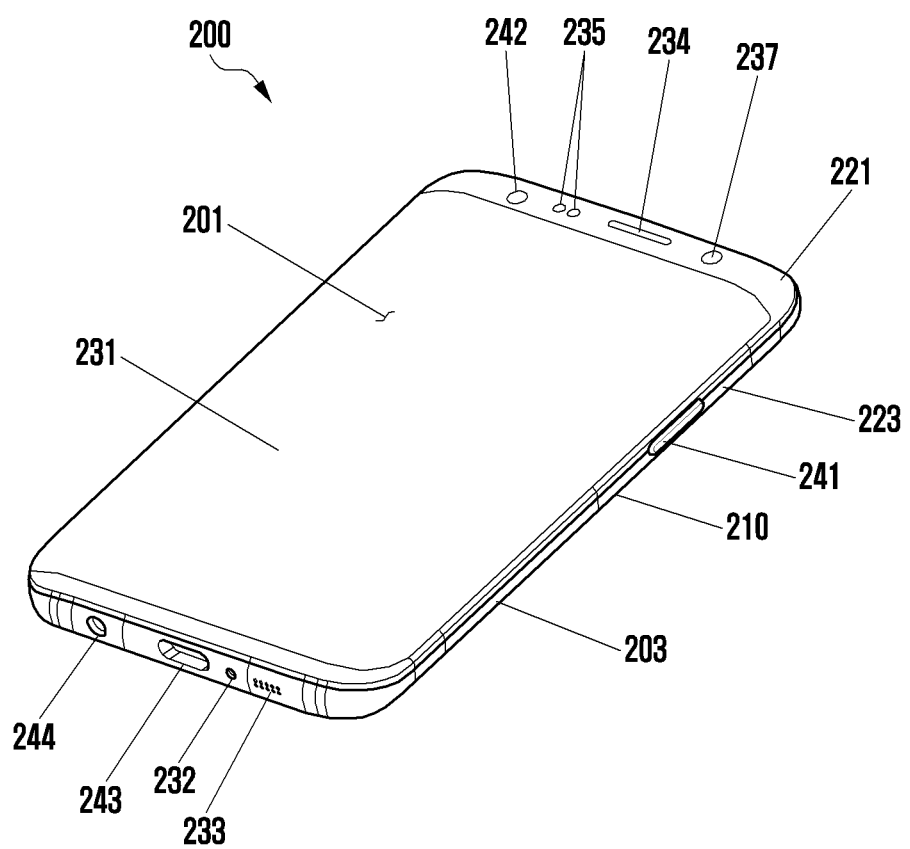
FIG. 2 is a perspective view illustrating a front surface of an electronic device according to various embodiments.
Figure 3:
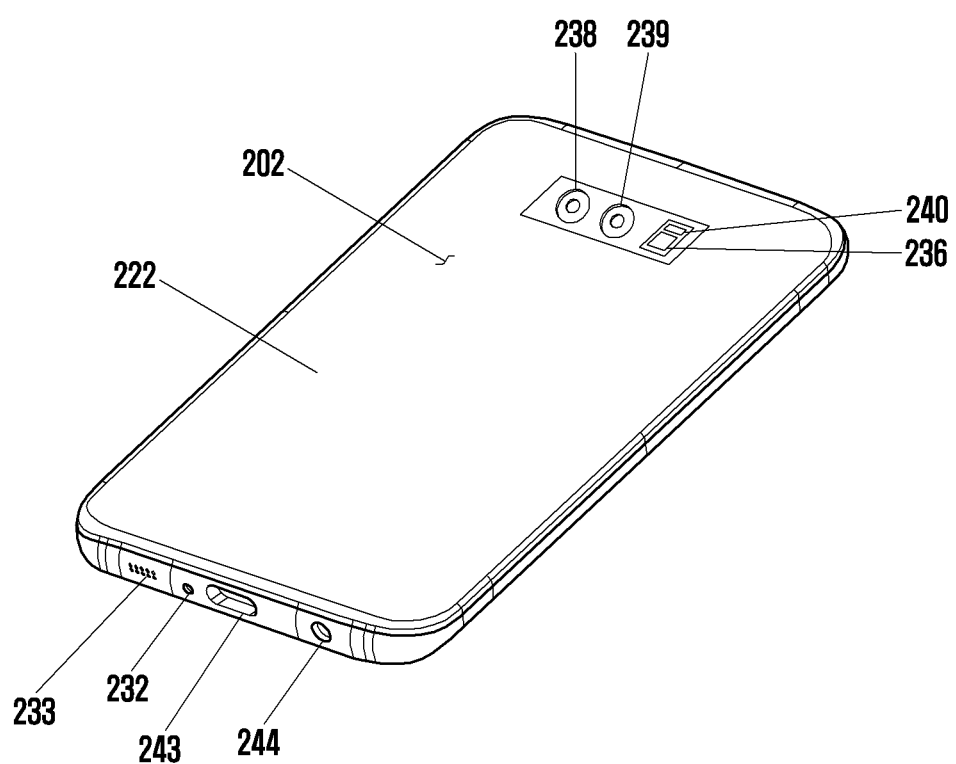
FIG. 3 is a perspective view illustrating a rear portion of an electronic device according to various embodiments.

FIG. 2 is a perspective view of the front surface of the electronic device and FIG. 3 is a perspective view of the rear surface of the electronic device.

Referring to FIG. 2 and FIG. 3, an electronic device 200 according to an embodiment may include a housing 210 including a first surface (or front surface) 201, a second surface (or rear surface) 202, and a side surface 203 surrounding the space between the first surface 201 and the second surface 202. In another embodiment (not illustrated), the housing may denote a structure that forms a part of the first surface 201, the second surface 202, and the side surface 203 illustrated in FIG. 2. According to an embodiment, the first surface 201 may be formed by a front plate 221, at least a part of which is substantially transparent (for example, a glass plate including various coating layers, or a polymer plate). The second surface 202 may be formed by a rear plate 222 that is substantially opaque. The rear plate 222 may be made of coated or colored glass, ceramic, polymer, metal (for example, aluminum, stainless steel (STS), or magnesium), or a combination of at least two of the above-mentioned materials. The side surface 203 may be formed by a side bezel structure (or "side member") 223 which is coupled to the front plate 221 and to the rear plate 222, and which includes metal and/or polymer. In some embodiments, the rear plate 222 and the side bezel structure 223 may be formed integrally and may include the same material (for example, a metal material such as aluminum).

According to an embodiment, the electronic device 200 may include at least one of a display 231, audio modules 232, 233, and 234, sensor modules 235 and 236, camera modules 237, 238, 239, and 240, a key input device 241, an indicator 242, or connector holes 243 and 244. In some embodiments, the electronic device 200 may omit at least one (e.g., the key input device 241 or the indicator 242) of the components or may further include other components.

The display 231 may be exposed through, for example, a substantial portion of the front plate 221. The display 231 may be coupled to or be disposed adjacent to a touch sensing circuit, a pressure sensor capable of measuring the intensity (pressure) of a touch, and/or a digitizer for detecting a magnetic field type stylus pen. In some embodiments, the display 231 may be coupled to or be disposed adjacent to a fingerprint sensor that detects the user's biometric information (e.g., fingerprint information).

The audio modules 232, 233, and 234 may include a microphone hole 232 and speaker holes 233 and 234. A microphone for acquiring an external sound may be arranged in the microphone hole 232, and a plurality of microphones may be arranged therein such that the direction of a sound can be sensed in some embodiments. The speaker holes 233 and 234 may include an outer speaker hole 233 and a speech receiver hole 234. In some embodiments, the speaker holes 233 and 234 and the microphone hole 232 may be implemented as a single hole, or a speaker may be included (for example, a piezoelectric speaker) without the speaker holes 233 and 234.

The sensor modules 235 and 236 may generate an electric signal or a data value corresponding to the internal operating condition of the electronic device 200 or the external environment condition thereof. The sensor modules 235 and 236 may include, for example, a first sensor module 235 (for example, a proximity sensor) arranged on the first surface 201 of the housing 210, and/or a second sensor module (not illustrated) (for example, a fingerprint sensor), and/or a third sensor module 236 (for example, an HRM sensor) arranged on the second surface 202 of the housing 210. The fingerprint sensor may be arranged not only on the first surface 201 (for example, the display 231) of the housing 210, but also on the second surface 202 thereof. The fingerprint sensor may be disposed integrally with the display 231 inside the housing 210. The electronic device 200 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 235.

The camera modules 237, 238, 239, and 240 may include a first camera device 237 arranged on the first surface 201 of the electronic device 200, a second camera device 238 and 239 arranged on the second surface 202 thereof, and/or a flash 240. The camera modules 237, 238, 239, and 240 may include a single lens or a plurality of lenses, an image sensor, and/or an image signal processor. The flash 240 may include, for example, a light-emitting diode or a xenon lamp. In some embodiments, two or more lenses (an infrared camera, a wide-angle lens, and a telephoto lens) and image sensors may be arranged on a single surface of the electronic device 200. According to various embodiments, in the electronic device 200, a first camera 238 and a second camera 239, i.e., dual cameras 238 and 239 may be disposed at the second surface 202, and a flash 240 may be disposed adjacent to the dual cameras 238 and 239. According to various embodiments, at least one camera and the flash 240 may operate by interworking with one function.

The key input device 241 may be arranged on the side surface 203 of the housing 210. In another embodiment, the electronic device 200 may not include a part of the above-mentioned key input device 241 or the entire key input device 241, and the key input device 241 (not included) may be implemented in another type, such as a soft key, on the display 231.

The indicator 242 may be disposed, for example, at a first surface 201 of the housing 210. The indicator 242 may provide, for example, state information of the electronic device 200 in the form of light and include a light emitting diode (LED).

The connector holes 243 and 244 may include a first connector hole 243 capable of containing a connector (for example, a USB connector) for transmitting/receiving power and/or data to/from an external electronic device, and/or a second connector hole (for example, an earphone jack) 244 capable of containing a connector for transmitting/receiving an audio signal to/from the external electronic device.

Figure 4:
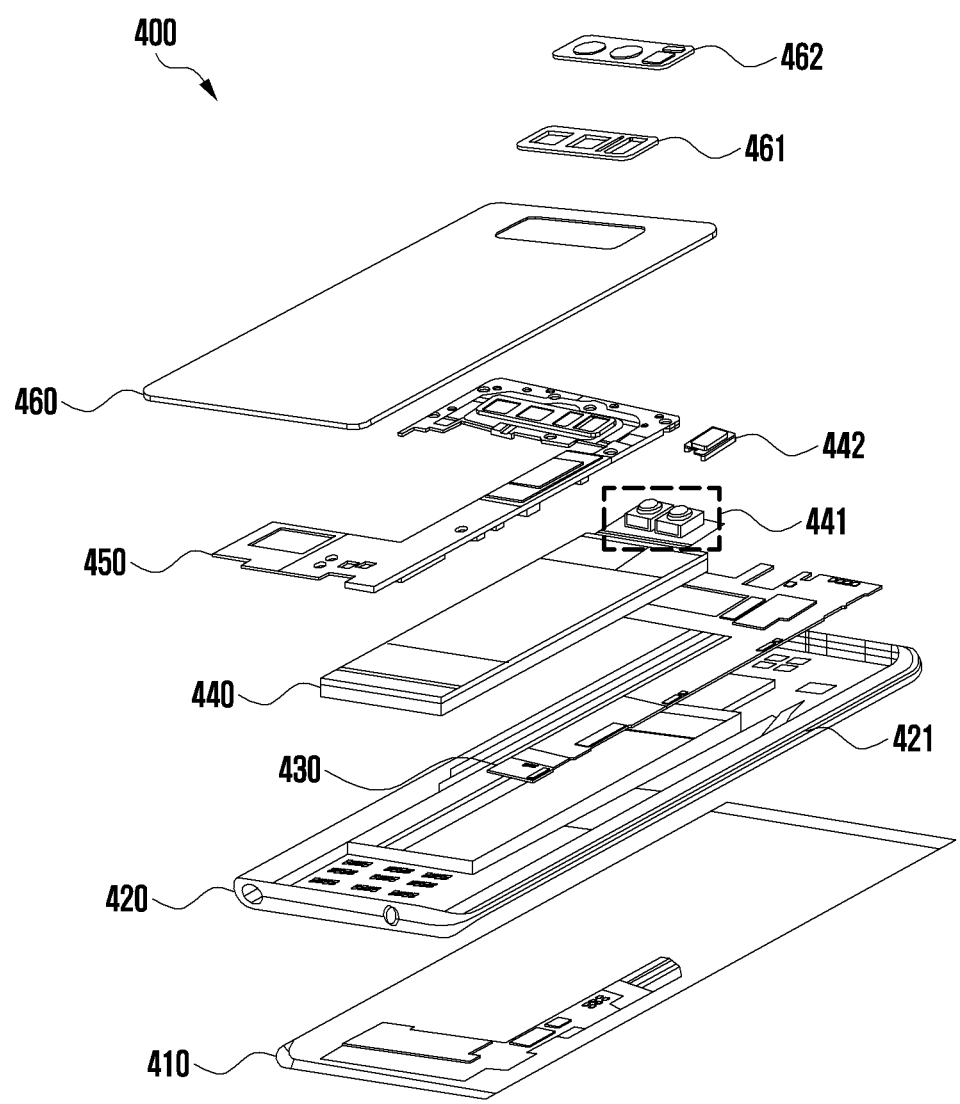
FIG. 4 is an exploded perspective view illustrating a disposition structure of components constituting an electronic device according to various embodiments.

FIG. 4 is an exploded perspective view illustrating a disposition structure of components constituting an electronic device according to various embodiments.

With reference to FIG. 4, an electronic device 400 may include a front plate 410 (e.g., the front plate 221), first support member 420 (e.g., bracket), side bezel structure 421 (e.g., the side bezel structure 223), printed circuit board (PCB) 430, battery 440, second support member 450 (e.g., rear case), antenna (not illustrated), and rear plate 460 (e.g., the rear plate 222). In some embodiments, at least one of the constituent elements (for example, the first support member 420 or the second support member 450) of the electronic device 400 may be omitted, or the electronic device 400 may further include another constituent element. At least one of the constituent elements of the electronic device 400 may be identical or similar to at least one of the constituent elements of the electronic device 200 of FIG. 2 or FIG. 3, and repeated descriptions thereof will be omitted herein.

The first support member 420 may be arranged inside the electronic device 400 and connected to the side bezel structure 421, or may be formed integrally with the side bezel structure 421. The first support member 420 may be made of a metal material and/or a nonmetal (for example, polymer) material, for example. The display 231 may be coupled to one surface of the first support member 420, and the printed circuit board 430 may be coupled to the other surface thereof. A processor, a memory, and/or an interface may be mounted on the printed circuit board 430. The processor may include, for example, one or more of a central processing device, an application processor, a graphic processing device, an image signal processor, a sensor hub processor, or a communication processor.

The memory may include a volatile memory or a non-volatile memory, for example.

The interface may include, for example, a high definition multimedia interface (HDMI), a universal serial bus (USB) interface, an SD card interface, and/or an audio interface. The interface may connect the electronic device 400 with an external electronic device electrically or physically, for example, and may include a USB connector, an SD card/MMC connector, or an audio connector.

The battery 440 is a device for supplying power to at least one constituent element of the electronic device 400, and may include a non-rechargeable primary cell, a rechargeable secondary cell, or a fuel cell, for example. At least a part of the battery 440 may be arranged on substantially the same plane with the printed circuit board 430, for example. The battery 440 may be arranged integrally inside the electronic device 400, or may be arranged such that the same can be attached to/detached from the electronic device 400.

The second support member 450 may be disposed between the rear plate 460 and the battery 440 and include an antenna pattern. The second support member 450 may include an opening corresponding to a camera module 441 and a flash 442 and fix a disposition position of the camera module 441 and the flash 442. The camera module 441 may include at least one camera and be implemented into one component including the flash 442. According to various embodiments, the flash 442 may be included in a light emitting component, which may include a heart rate monitor and a biometric sensor (e.g., fingerprint sensor). The light emitting component may include a sensor implemented based on optics and touch. According to another embodiment, the camera module 441 and the flash 442 may be separately implemented and disposed adjacent to each other.

An antenna (not illustrated) may be disposed between the rear plate 460 and the battery 440. The antenna may include, for example, a near field communication (NFC) antenna, a wireless charging antenna, and/or a magnetic secure transmission (MST) antenna and be formed by some or a combination of the second support members 450. The antenna may, for example, perform short range communication with an external device or may wirelessly transmit and receive power required for charging. In another embodiment, an antenna structure may be formed by some or a combination of the side bezel structure 421 and/or the first support member 420.

The rear plate 460 may be a rear cover of the electronic device 400 and be disposed at a rear surface of the electronic device 400 to protect components from the outside. The rear plate 460 may include an opening corresponding to the camera module 441 and the flash 442. With reference to FIG. 4, although one opening is illustrated to correspond to the camera module 441 and the flash 442, the disclosure is not limited thereto.

A camera window 462 for protecting the camera module 441 and the flash 442 may be disposed at the upper end of the camera module 441 and the flash 442. The camera window 462 may be attached to the camera module 441 and the flash 442 using an adhesive member 461.

Figure 5:
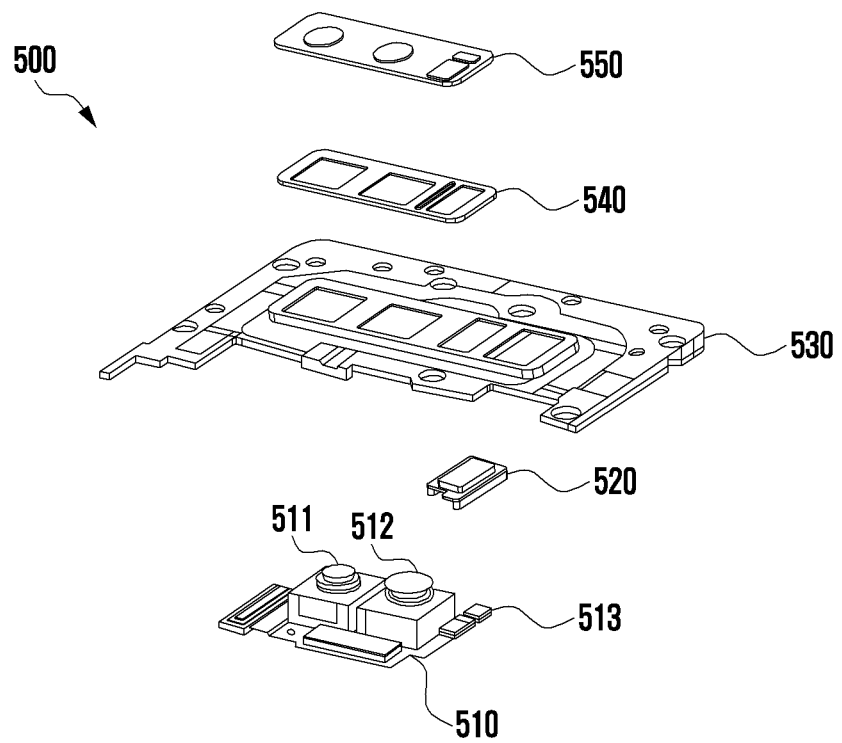
FIG. 5 is an exploded perspective view illustrating a disposition structure of a camera and a flash according to various embodiments.

FIG. 5 is an exploded perspective view illustrating a disposition structure of a camera and a flash according to various embodiments.

With reference to FIG. 5, an electronic device 500 (e.g., the electronic device 400) may include a camera module 510 (e.g., the camera module 441)) including a first camera 511, a second camera 512, and a flash 513. The flash 513 may dispose a flash window 520 for amplifying generated light at the upper end thereof. The electronic device 500 may include a rear case 530 (e.g., the second support member 450) and protect the camera module 510 or fix a position of the camera module 510 based on the second support member 530. According to various embodiments, the electronic device 500 may assemble the camera module 510 and the second support member 530, fix a position of the camera module 510, or use an adhesive member 540 (e.g., tape, camera window tape) for waterproof of the camera module 510. The electronic device 500 may dispose a camera window 550 for protecting the camera module 510 from an external shock at the upper end of the adhesive member 540. A rear surface of the camera window 550 may include a black matrix (BM) area. The BM area may include a non-driving area of a screen edge. According to various embodiments, the electronic device 500 may be implemented such that a slit area implemented in the adhesive member 540 is not visible from outside based on the BM area included in the rear surface of the camera window 550.

The camera window 550 and the second support member 530 may be adhered to each other based on the adhesive member 540.

According to various embodiments, the adhesive member 540 may be a tape for attaching the camera window 550 and the second support member 530 to each other. The adhesive member 540 may form openings corresponding to the cameras 511 and 512 and the flash 513 included in the camera module 510. The adhesive member 540 may include a first adhesive layer at one surface (e.g., upper surface) of a base layer about the base layer and include a second adhesive layer at the other surface (e.g., lower surface) of the base layer. For example, the adhesive member 540 may be attached to the camera window 550 based on the first adhesive layer and be attached to the second support member 530 based on the second adhesive layer. The adhesive member 540 may fix a position of the camera module 510. The adhesive member 540 may prevent inflow of a foreign material from the outside. For example, the adhesive member 540 may perform waterproof and dustproof functions of the camera module 510.

Figure 6:
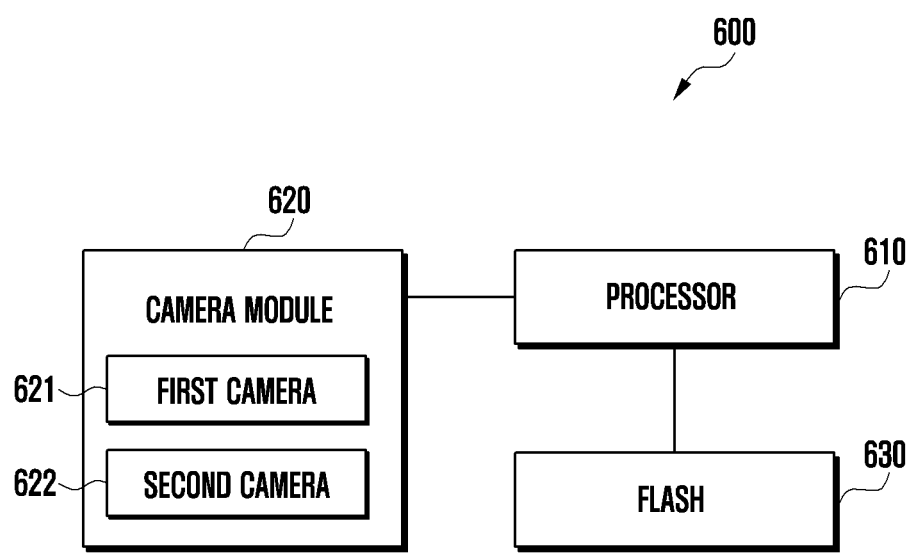
FIG. 6 is a block diagram illustrating electronic device components according to various embodiments.

FIG. 6 is a block diagram illustrating electronic device components according to various embodiments.

With reference to FIG. 6, an electronic device 600 (e.g., the electronic device 500) according to various embodiments may include a processor 610, a camera module 620, and a flash 630. The processor 610 may control a plurality of connected hardware or software components and perform various data processing and operations. The processor 610 may be implemented into, for example, a system on chip (SoC).

The camera module 620 of the electronic device 600 may include a first camera 621 and a second camera 622. The first camera 621 and the second camera 622 may be disposed at a rear surface of the electronic device 600 and capture an image to correspond to the same direction. For example, the first camera 621 and the second camera 622 may each be a telephoto camera or a wide angle camera. According to various embodiments, the cameras (e.g., the first camera 621 and the second camera 622) included in the camera module 620 may include a telephoto camera, a wide angle camera, an infrared camera, an iris recognition camera, and the like. According to various embodiments, the camera module 620 may be a combination of a telephoto camera and a wide angle camera, a combination of a general camera and an infrared camera, and a combination of a general camera and an iris recognition camera. According to various embodiments, the disclosure is not limited to the above-described combination.

The flash 630 of the electronic device 600 is a light emitting unit that generates light and may generate light to capture an image in a dark environment. The flash 630 may be disposed in the same direction (e.g., a rear direction of the electronic device 600) as that of the first camera 621 and the second camera 622. According to various embodiments, the electronic device 600 may operate by interworking with operations of the first camera 621 and the second camera 622 included in the camera module 620 and an operation of the flash 630. For example, when the electronic device 600 receives a photographing command, the electronic device 600 may determine illuminance of a periphery thereof and perform operations of the first camera 621 and the second camera 622 and an operation of the flash 630 at the same time point. The electronic device 600 may capture an image using the first camera 621 and the second camera 622 at a time point in which light is generated in the flash 630. The electronic device 600 may capture an image based on light of the flash 630.

According to various embodiments, the camera module 620 and the flash 630 may be disposed adjacent to each other, and positions thereof may be adjusted based on an internal space of the electronic device 600. For example, the flash 630 may be disposed at the upper end or the lower end of the camera module 620 or may be disposed at a side surface thereof. According to various embodiments, the electronic device 600 may use an adhesive member (e.g., tape) for fixing the camera module 620 and the flash 630.

According to various embodiments, light generated in the flash 630 may be reflected based on an adhesive layer constituting the adhesive member, and the reflected light may enter into the camera module 620. Because of the inflow of light reflected by the adhesive layer, a quality of an image captured using the camera module 620 may be deteriorated. According to various embodiments, the adhesive member may include a slit area (e.g., space, punching, and perforation) between the camera module 620 and the flash 630. The slit area implemented between the camera module 620 and the flash 630 may block a continuous medium between the camera module 620 and the flash 630. Light generated in the flash 630 may be reflected or scattered based on the slit area. The slit area may prevent light generated in the flash 630 from entering into the camera module 620. According to various embodiments, the electronic device 600 may block light generated in the flash 630 from entering into the camera module 620 based on the adhesive member including the slit area.

Figure 7:
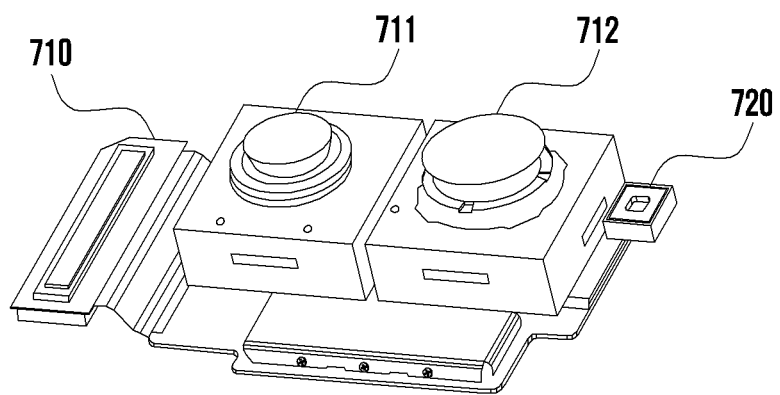
FIG. 7 is a perspective view illustrating components constituting a camera and a flash according to various embodiments.

FIG. 7 is a perspective view illustrating components constituting a camera and a flash according to various embodiments.

With reference to FIG. 7, a camera module 710 may include a first camera 711, a second camera 712, and a flash 720 and be implemented into one component. For example, the first camera 711 and the second camera 712 may each include a telephoto camera or a wide angle camera, and the camera module 710 may combine the first camera 711 and the second camera 712. The flash 720 may include a light emitting diode (LED) for generating light. Although not illustrated, in order to amplify light generated in the flash 720, a flash window (not illustrated) may be disposed above the flash 720. According to various embodiments, the first camera 711, the second camera 712, and the flash 720 may be disposed adjacent to each other and be integrated into one component (e.g., the camera module 710).

Figure 8:
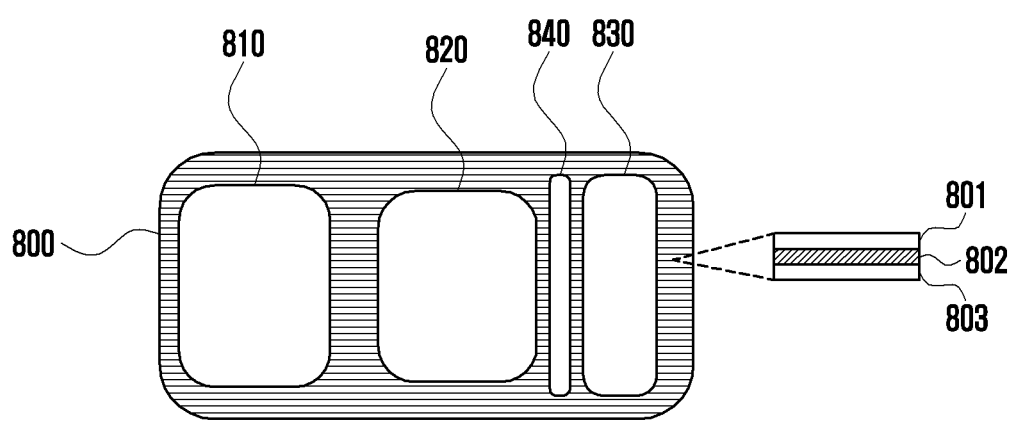
FIG. 8 is a diagram illustrating an adhesive member having a slit area formed between an opening corresponding to a camera and an opening corresponding to a flash according to various embodiments.

FIG. 8 is a diagram illustrating an adhesive member having a slit area formed between an opening corresponding to a camera and an opening corresponding to a flash according to various embodiments.

FIG. 8 illustrates an adhesive member 800 (e.g., the adhesive member 540, tape) disposed between the camera window (e.g., the camera window 550) and the rear case (e.g., the second support member 530) to attach the camera window and the rear case to each other. The adhesive member 800 may be implemented in a structure in which a first adhesive layer 801, a base layer 802, and a second adhesive layer 803 are stacked. The first adhesive layer 801, the base layer 802, and the second adhesive layer 803 may be transparent or opaque. The base layer 802 may include a polyester (PET) film. For example, the first adhesive layer 801 may be stacked at an upper surface of the adhesive member 800, and the second adhesive layer 803 may be disposed at a lower surface of the adhesive member 800. Each of the first adhesive layer 801, the base layer 802, and the second adhesive layer 803 may be formed in a thickness of about 0.1 T (e.g., about 0.1 mm).

According to various embodiments, the adhesive member 800 may include a first opening 810 corresponding to a first camera (e.g., the first camera 511) included in the camera module (e.g., the camera module 510), a second opening 820 corresponding to a second camera (e.g., the second camera 512), and a third opening 830 corresponding to a flash (e.g., the flash 513). According to various embodiments, the adhesive member 800 may include a slit area 840 between the second opening 820 and the third opening 830 and block light generated in the flash from entering into the second camera based on the slit area 840. For example, light generated in the flash may be entered into the second camera using an adhesive layer (e.g., the first adhesive layer 801 and the second adhesive layer 803) of the adhesive member 800 as a path. According to another embodiment, light generated in the flash may be entered into the second camera based on the base layer 802 of the adhesive member 800. In the adhesive member 800 according to various embodiments, the slit area 840 may be formed between an opening (e.g., the first opening 810 and the second opening 820) corresponding to the camera and an opening (e.g., the third opening 830) corresponding to the flash, and the adhesive member 800 may block inflow of light generated in the flash based on the slit area 840. For example, light generated in the flash may be reflected or scattered based on the slit area 840. According to various embodiments, by blocking the light generated in the flash from entering into the camera by the slit area 840, a quality of an image photographed using the camera may be prevented from being deteriorated.

Figure 9:
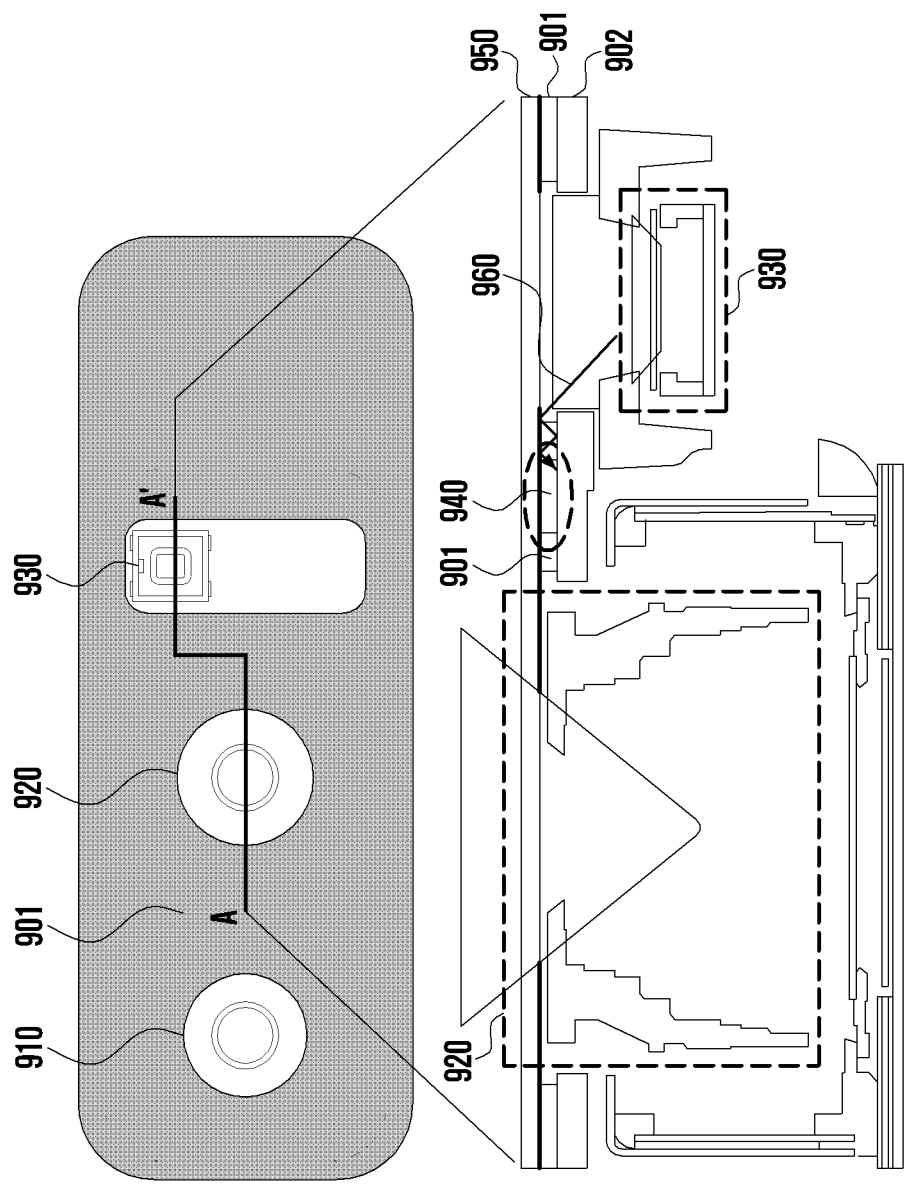
FIG. 9 is a diagram illustrating a process of blocking inflow of light generated in a flash based on a slit area according to various embodiments.

FIG. 9 is a diagram illustrating a process of blocking inflow of light generated in a flash based on a slit area according to various embodiments.

With reference to FIG. 9, in the electronic device, an adhesive member 901 including a slit area 940 may be attached on a second support member 902. For example, a camera window 950 may be attached to one surface (e.g., upper surface) of the adhesive member 901, and the second support member 902 may be attached to the other surface (e.g., lower surface) thereof. A rear surface of the camera window 950 may further include a black matrix (BM) area. The BM area may be an area in which components disposed below are not visible. FIG. 9 illustrates a cross-sectional view corresponding to a section "A-A". With reference to the cross-sectional view, the adhesive member 901 includes a slit area 940 between the camera (e.g., a first camera 910 and a second camera 920) and a flash 930 and may block a movement of light 960 generated in the flash 930 based on the slit area 940. According to various embodiments, in the adhesive member 901 of the electronic device (e.g., the electronic device 500), the slit area 940 may be formed between an opening corresponding to the cameras 910 and 920 (e.g., light receiving component) and an opening corresponding to the flash 930 (e.g., light emitting component). The slit area 940 may block light 960 generated in the flash 930 from entering into the cameras 910 and 920. For example, the slit area 940 may reflect or scatter light generated in the flash 930. According to various embodiments, the electronic device may block light 960 generated in the flash 930 from moving to the camera based on the slit area formed in the adhesive member 901.

Figure 10:
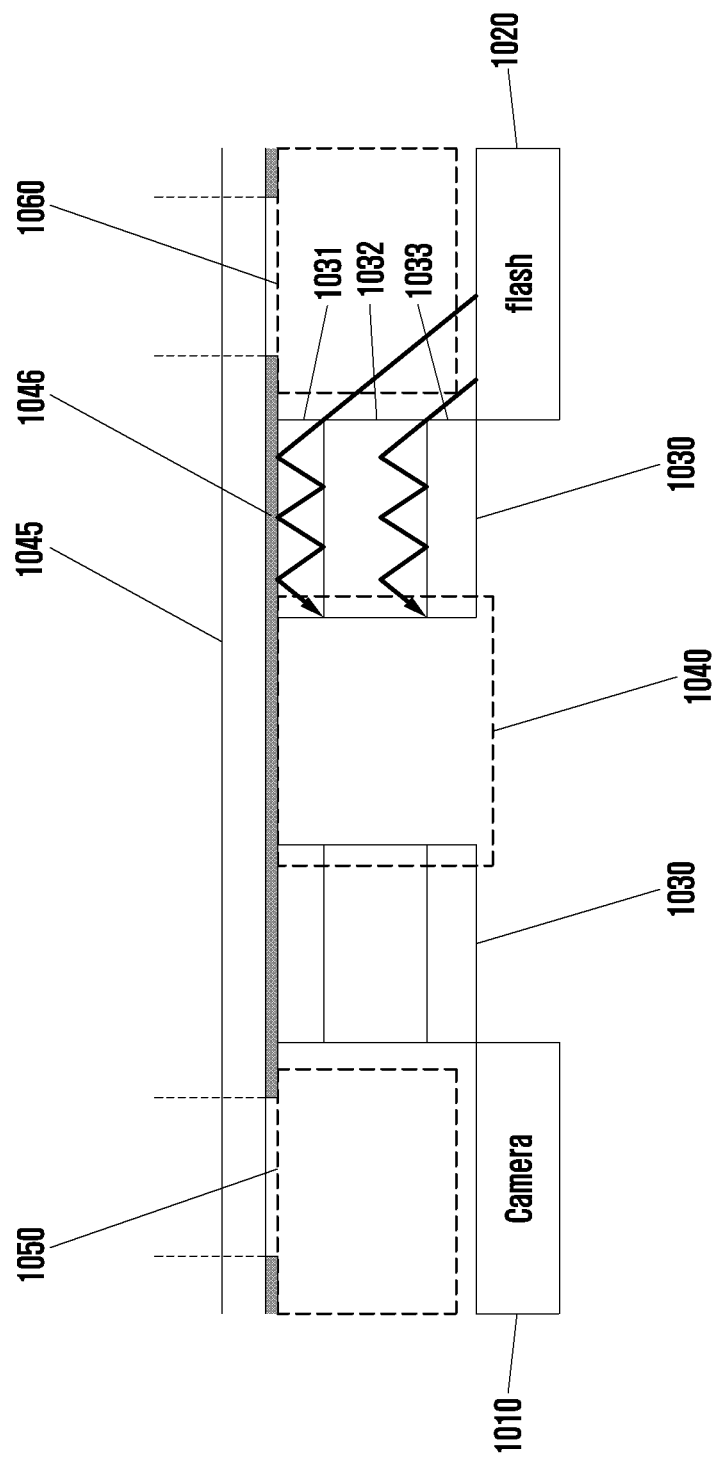
FIG. 10 is a diagram illustrating a process in which light generated in a flash is blocked by a slit area according to various embodiments.

FIG. 10 is a diagram illustrating a process in which light generated in a flash is blocked by a slit area according to various embodiments.

FIG. 10 illustrates in more detail a slit area (e.g., the slit area 940) between the camera (e.g., the second camera 920)

and the flash (e.g., the flash 930) illustrated in FIG. 9. With reference to FIG. 10, at least a portion of an adhesive member 1030 positioned between a camera 1010 and a flash 1020 may include a slit area 1040. For example, the adhesive member 1030 may form a slit area 1040 between a first opening 1050 formed to correspond to the camera 1010 and a second opening 1060 formed to correspond to the flash 1020 through a process of punching or perforating. With reference to FIG. 10, a camera window 1045 may be disposed on an adhesive member 1030, and the camera window 1045 may cover the first opening 1050, the second opening 1060, and the slit area 1040. According to various embodiments, the camera window 1045 may be a member for waterproofing and dustproofing the first opening 1050, the second opening 1060, and the slit area 1040.

The adhesive member 1030 may be implemented by stacking an adhesive layer (e.g., a first adhesive layer 1031 and a second adhesive layer 1033) and a base layer 1032. For example, in the adhesive member 1030, the first adhesive layer 1031 may be disposed at an upper surface of the base layer 1032, and the second adhesive layer 1033 may be disposed at a lower surface of the base layer 1032 about the base layer 1032. According to various embodiments, the first adhesive layer 1031 may be attached to the camera window 1045, and the second adhesive layer 1033 may be attached to a support member (not illustrated) (e.g., the second support member 530 of FIG. 5) that supports the camera 1010 and the flash 1020. A rear surface of the camera window 1045 may include at least partially include a BM area 1046. For example, the BM area 1046 may be included in a rear surface of the camera window 1045 based on a position in which the slit area 1040 is formed. The BM area 1046 may be an area that enables the slit area 1040 formed beneath not to be visible. According to various embodiments, components disposed below the BM area 1046 may not be visible from the outside based on the BM area 1046 included in the rear surface of the camera window 1045.

According to various embodiments, the adhesive member 1030 includes a slit area 1040 corresponding to an opening formed through punching or perforation and may block a movement of light generated in the flash 1020 based on the slit area 1040.

Figure 11A:
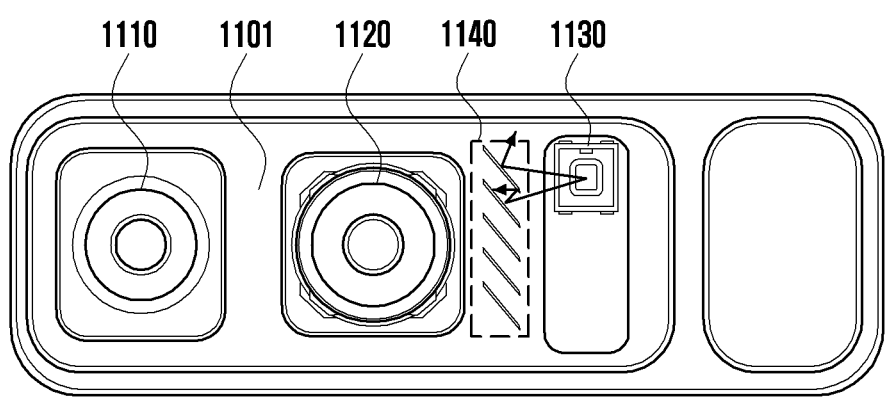
FIGS. 11A and 11B are diagrams illustrating an adhesive member in which a slit area formed between a camera and a flash is implemented in a hatched form according to various embodiments.
Figure 11B:
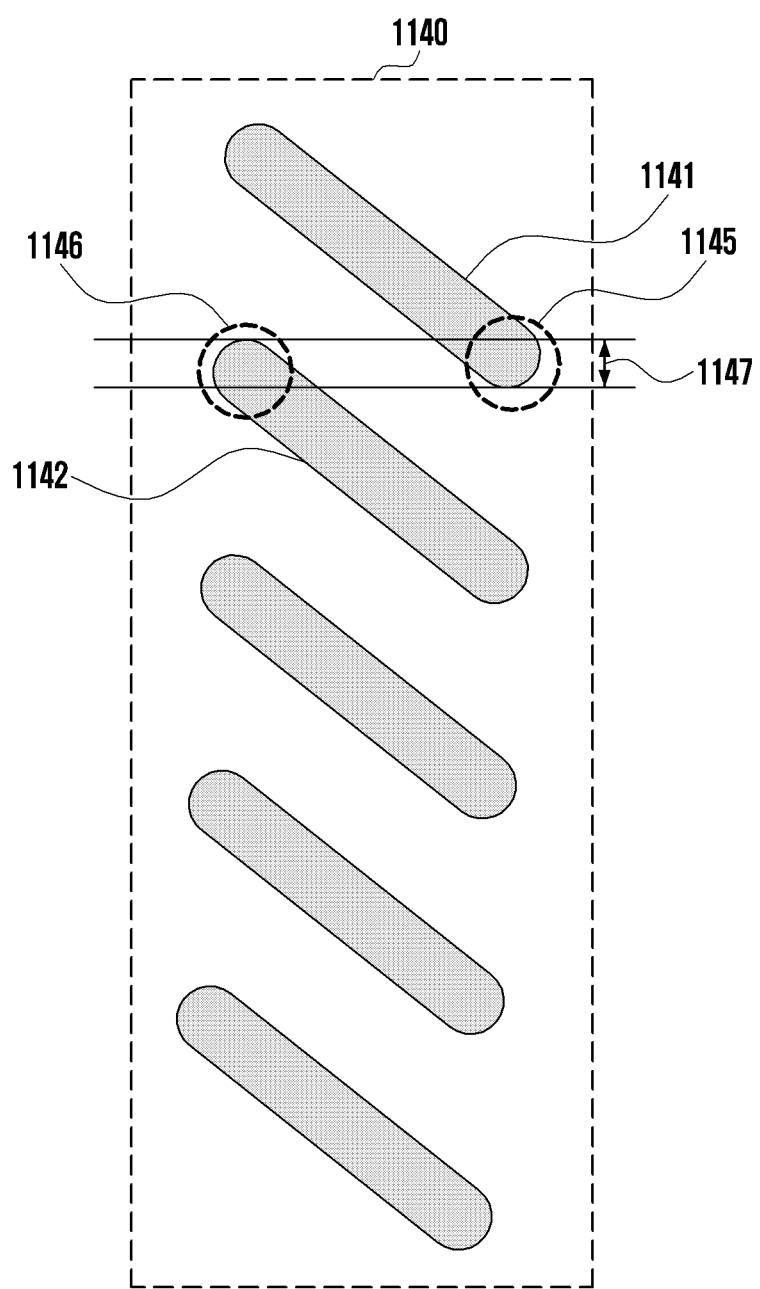

FIGS. 11A and 11B are diagrams illustrating an adhesive member implementing a slit area formed between a camera and a flash in a hatched form according to various embodiments.

With reference to FIG. 11A, when an electronic device (e.g., the electronic device 500) forms a slit area 1140 between cameras 1110 and 1120 and a flash 1130, the slit area 1140 may be implemented into a hatch form. For example, the slit area 1140 may include at least one hatched slit (e.g., air gap). The hatched slit may be implemented to correspond to an angle set so that light generated in the flash 1130 does not enter into the cameras 1110 and 1120.

With reference to FIG. 11B, the slit area 1140 may be implemented based on at least one hatched slit (e.g., a first slit 1141 and a second slit 1142). The first slit 1141 and the second slit 1142, which are implemented in a hatched form, may be openings punched with inclined based on the same angle. For example, the first slit 1141 and the second slit 1142 may be implemented based on an angle set so that light of the flash 1130 does not enter into the cameras 1110 and 1120. The first slit 1141 and the second slit 1142 may be formed to at least partially overlap with each hatch. For example, a lower end area 1145 of the first slit 1141 and an upper end area 1146 of the second slit 1142 may cross each other in the same phase 1147. According to various embodiments, a range in which the first slit 1141 and the second slit 1142 intersect may be a range that blocks light of the flash 1130 from entering the cameras 1110 and 1120. A size of a range in which the first slit 1141 and the second slit 1142 intersect may be determined to block light of the flash 1130 from entering into the cameras 1110 and 1120. According to various embodiments, the electronic device 500 may block a moving path in which light generated in the flash 1130 moves to the cameras 1110 and 1120 based on the slit area 1140 including at least one hatched slit (e.g., the first slit 1141 and the second slit 1142)

FIG. 11A illustrates an adhesive member 1101 in which a camera window (not illustrated) disposed at an upper surface of the adhesive member 1101 is removed. According to various embodiments, when the camera window is disposed at the upper surface of the adhesive member 1101, the slit area 1140 may not be visually illustrated.

Figure 12:
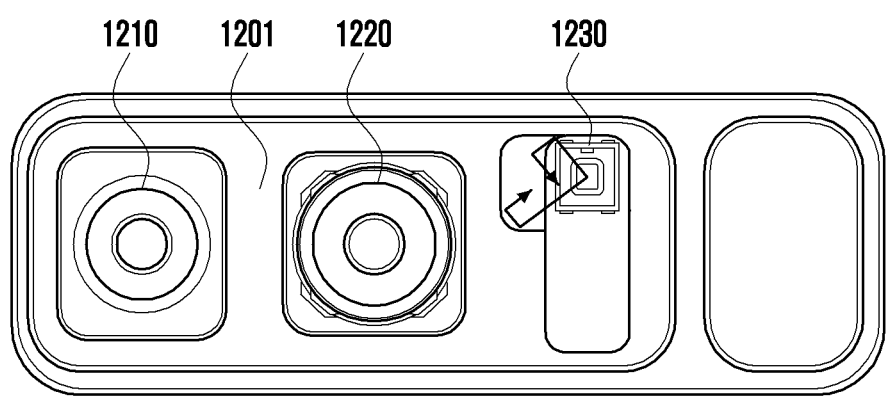
FIG. 12 is a diagram illustrating an adhesive member having a space formed to correspond to a partial area adjacent to a flash according to various embodiments.

FIG. 12 is a diagram illustrating an adhesive member having a space formed to correspond to a partial area adjacent to a flash according to various embodiments.

With reference to FIG. 12, a space may be formed at least partially in an adhesive member 1201 of the electronic device (e.g., the electronic device 500) based on a position in which a flash 1230 is disposed. For example, the adhesive member 1201 may implement an adhesive area at least partially adjacent to the flash 1230 into a space based on an adhesive area between cameras 1210 and 1220 and the flash 1230. According to various embodiments, among light generated in the flash 1230, an amount of light entered into the cameras 1210 and 1220 may be reduced by some spaces implemented by the adhesive member 1201. As an amount of light entering into the cameras 1210 and 1220 is reduced, a quality of an image captured using the cameras 1210 and 1220 can be prevented from being deteriorated.

FIG. 12 illustrates the adhesive member 1201 in which a camera window (not illustrated) disposed at an upper surface of the adhesive member 1201 is removed. According to various embodiments, when the camera window is disposed at the upper surface of the adhesive member 1201, some spaces implemented in the adhesive member 1201 may not be visually illustrated.

Figure 13:
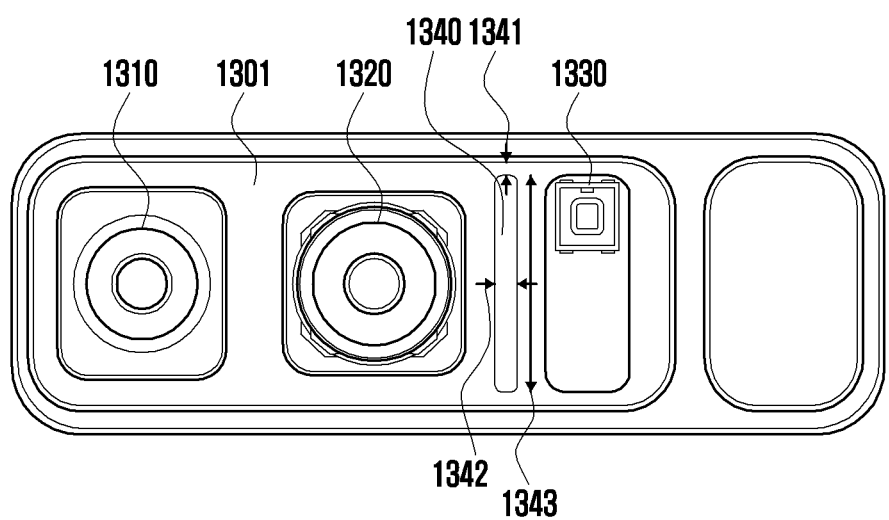
FIG. 13 is a diagram illustrating a size of a slit area according to various embodiments.

FIG. 13 is a diagram illustrating a size of a slit area according to various embodiments.

With reference to FIG. 13, an adhesive member 1301 of the electronic device (e.g., the electronic device 500) may include a slit area 1340 between cameras 1310 and 1320 and a flash 1330. The slit area 1340 may scatter or reflect light so that light generated in the flash 1330 does not enter into the cameras 1310 and 1320. The slit area 1340 may be implemented in a size greater than or equal to a threshold so as to block light. For example, a first distance 1341 corresponding to a distance between the slit area 1340 and an outer edge of an adhesive member may be implemented in at least about 1 mm and in generally about 1.2 mm or more. When the first distance 1341 is implemented in at least about 1 mm, a waterproof function of the electronic device may be fully performed. A second distance 1342 corresponding to a width (e.g., the horizontal length) of the slit area 1340 may be implemented in a length of about three times based on a thickness of the adhesive member 1301. For example, the adhesive member 1301 may have a structure in which a first adhesive layer, a base layer, and a second adhesive layer are stacked, and each of the first adhesive layer, the base layer, and the second adhesive layer may be about 0.1 mm. A thickness of the adhesive member 1301 may be about 0.3 mm, and the second distance 1342 corresponding to a horizontal length of the slit area 1340 may be about 0.9 mm.

A third distance 1343 corresponding to a vertical length of the slit area 1340 may be implemented in a length of about 1.5 times based on a vertical length of the flash 1330.

According to various embodiments, a size of the slit area 1340 included in the adhesive member 1301 may be set to block light generated in the flash 1330.

FIG. 13 illustrates an adhesive member 1301 in which a camera window (not illustrated) disposed at an upper surface of the adhesive member 1301 is removed. According to various embodiments, when the camera window is disposed at the upper surface of the adhesive member 1301, a shape of the slit area 1340 may not be visually illustrated.

According to various embodiments, the electronic device may implement a slit area between a light emitting component and a light receiving component to block a movement of light so that light generated in the light emitting component does not move to the light receiving component. For example, an electronic device in which a biometric sensor for recognizing a user's fingerprint is mounted in a display (e.g., the display device 160 of FIG. 1) may perform fingerprint authentication based on an optical method. For example, the biometric sensor may identify a fingerprint pattern using light generated in an adjacent light emitting component and perform fingerprint authentication based on the identified fingerprint pattern. Light generated in the light emitting component may be delivered to at least one light receiving component disposed in a periphery thereof. As light enters the light receiving component, it may be difficult to identify a fingerprint pattern. According to various embodiments, in order to block a movement of light generated in the light emitting component, a slit area may be formed between the light emitting component and the light receiving component. For example, an adhesive member for fixing a mounted biometric sensor may include the slit area, and light generated in the light emitting component based on the slit area may be blocked from entering into the biometric sensor (e.g., light receiving component).

According to various embodiments of the disclosure, an electronic device includes a housing including a front plate, a rear plate facing in a direction opposite to that of the front plate, a side member enclosing a space between the front plate and the rear plate, a touch screen disposed in the space and exposed through the front plate, and a camera assembly exposed through one of the front plate or the rear plate. The camera assembly includes a camera lens facing a first portion of the front plate or the rear plate, a flash facing a second portion of the front plate or the rear plate, and an opaque layer disposed between the camera lens and the flash when viewed from above the front plate or the rear plate, wherein the second portion is adjacent to the first portion, and the camera lens and the flash are disposed side by side in a first direction and the opaque layer includes a first slit extended between the camera lens and the flash based on a second direction substantially perpendicular to the first direction.

According to various embodiments, the electronic device may further include a first adhesive layer disposed between the opaque layer and the front plate or the rear plate, and the first adhesive layer may include a second slit extended along the first slit.

According to various embodiments, the electronic device may further include a second adhesive layer disposed between the opaque layer and the front plate or the rear plate, and the second adhesive layer may include a third slit extended along the first slit.

According to various embodiments, at least some of the first slit to the third slit may block a light travel path from the flash to the camera lens.

According to various embodiments, at least some of the first slit to the third slit may reflect or scatter at least a portion of light generated in the flash.

According to various embodiments, the first adhesive layer, the second adhesive layer, and the opaque layer may each be formed in a thickness of at least 1 mm.

According to various embodiments, the first slit may have a length corresponding to the second direction based on a length of at least three times larger than a thickness in which the first adhesive layer, the opaque layer, and the second adhesive layer are stacked.

According to various embodiments, the first slit may have a length corresponding to the first direction based on a length of at least 1.5 times larger than a length of the flash.

According to various embodiments, the first slit may have a length corresponding to the first direction according to a size of the flash.

According to various embodiments, the camera lens and the flash may be set to operate by interworking with one function.

According to various embodiments, the opaque layer may form an opening at least partially based on a size of the flash.

According to various embodiments, the electronic device may further include a camera window covering the camera lens, the flash, and the opaque layer, wherein the camera window may include a black matrix (BM) area at least partially corresponding to the opaque layer at a rear surface thereof.

According to various embodiments, the camera window may not include a BM area in an area corresponding to the camera lens and the flash.

According to various embodiments, the opaque layer may include a polyester (PET) film, fix a position of the camera lens and the flash, and perform waterproof and dustproof functions.

According to various embodiments of the disclosure, an electronic device includes a housing including a front plate, a rear plate facing in a direction opposite to that of the front plate, and a side member enclosing a space between the front plate and the rear plate; a touch screen disposed in the space and exposed through the front plate; and a camera assembly exposed through the front plate or the rear plate. The camera assembly includes a camera lens facing a first portion of the front plate or the rear plate; a flash facing a second portion of the front plate or the rear plate; and an opaque layer disposed between the camera lens and the flash when viewed from above the front plate or the rear plate, wherein the second portion is adjacent to the first portion, the camera lens and the flash are disposed side by side in a first direction, and the opaque layer includes a slit area extended between the camera lens and the flash based on a second direction substantially perpendicular to the first direction.

According to various embodiments, the slit area may include at least one slit implemented in a hatched form to correspond to a preset angle.

According to various embodiments, the slit area may include a first slit and a second slit implemented to correspond to the preset angle, wherein in the first slit and the second slit, one end of the first slit and the other end of the second slit may be overlapped at least partially based on the same phase.

According to various embodiments, a size of the at least partially overlapped area may be determined to block a movement of light generated in the flash.

According to various embodiments, the first slit and the second slit may reflect or scatter at least a portion of light generated in the flash.

According to various embodiments, the electronic device may further include a camera window covering the camera lens, the flash, and the opaque layer, wherein the camera window may include a black matrix (BM) area at least partially corresponding to the opaque layer at a rear surface thereof.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
 a housing comprising a front plate, a rear plate facing in a direction opposite to that of the front plate, and a side member enclosing a space between the front plate and the rear plate;
 a touch screen disposed in the space and exposed through the front plate; and
 a camera assembly exposed through the front plate or the rear plate,
 wherein the camera assembly comprises:
 a camera lens facing a first portion of the front plate or the rear plate;
 a flash facing a second portion of the front plate or the rear plate; and
 an opaque layer disposed between the camera lens and the flash when viewed from above the front plate or the rear plate; and
 a first adhesive layer disposed between the opaque layer and the front plate or the rear plate,
 wherein the second portion is adjacent to the first portion, the camera lens and the flash are disposed side by side in a first direction, and the opaque layer comprises a first slit extended between the camera lens and the flash based on a second direction substantially perpendicular to the first direction, and wherein the first adhesive layer comprises a second slit extended along the first slit.

2. The electronic device of claim 1, further comprising a second adhesive layer disposed between the opaque layer and the front plate or the rear plate,
wherein the second adhesive layer comprises a third slit extended along the first slit.

3. The electronic device of claim 2, wherein at least some of the first slit to the third slit blocks a light travel path from the flash to the camera lens or reflect or scatter at least a portion of light generated in the flash.

4. The electronic device of claim 2, wherein the first adhesive layer, the second adhesive layer, and the opaque layer are each formed in a thickness of at least 1 mm, and
wherein in the first slit, a length corresponding to the second direction is determined based on a length of at least three times larger than a thickness in which the first adhesive layer, the opaque layer, and the second adhesive layer are stacked.

5. The electronic device of claim 1, wherein in the first slit, a length corresponding to the first direction is determined based on a length of at least 1.5 times larger than that of the flash.

6. The electronic device of claim 1, wherein in the first slit, a length corresponding to the first direction is determined to correspond to a size of the flash.

7. The electronic device of claim 1, wherein the camera lens and the flash are set to operate by interworking with one function.

8. The electronic device of claim 1, wherein the opaque layer comprises a polyester (PET) film and forms at least partially an opening based on a size of the flash, fixes a position of the camera lens and the flash, and performs waterproof and dustproof functions.

9. The electronic device of claim 1, further comprising a camera window configured to cover the camera lens, the flash, and the opaque layer,
wherein a rear surface of the camera window comprises a black matrix (BM) area at least partially corresponding to the opaque layer, and
wherein the camera window does not comprise a BM area in an area corresponding to the camera lens and the flash.

10. An electronic device, comprising:
a housing comprising a front plate, a rear plate facing in a direction opposite from that of the front plate, and a side member enclosing a space between the front plate and the rear plate;
a touch screen disposed in the space and exposed through the front plate; and
a camera assembly exposed through the front plate or the rear plate,
wherein the camera assembly comprises:
a camera lens facing a first portion of the front plate or the rear plate;
a flash facing a second portion of the front plate or the rear plate;
an opaque layer disposed between the camera lens and the flash when viewed from above the front plate or the rear plate; and
at least one adhesive layer disposed between the opaque layer and the front plate or the rear plate,
wherein the second portion is adjacent to the first portion, the camera lens and the flash are disposed side by side in a first direction, and the opaque layer comprises a slit area extended between the camera lens and the flash based on a second direction substantially perpendicular to the first direction, and
wherein the at least one adhesive layer comprises a slit extended along the slit area.

11. The electronic device of claim 10, wherein the slit area comprises at least one slit implemented in a hatched form to correspond to a preset angle.

12. The electronic device of claim 11, wherein the slit area comprises a first slit and a second slit corresponding to the preset angle,
wherein in the first slit and the second slit, one end of the first slit and the other end of the second slit are at least partially overlapped based on the same phase, and
wherein a size of the at least partially overlapped area is determined to block a movement of light generated in the flash.

13. The electronic device of claim 10, wherein the first slit and the second slit reflect or scatter at least a portion of light generated in the flash.

14. The electronic device of claim 10, further comprising a camera window configured to cover the camera lens, the flash, and the opaque layer,
wherein a rear surface of the camera window comprises a black matrix (BM) area at least partially corresponding to the opaque layer.

* * * * *